US011135877B2

(12) United States Patent
Kujime et al.

(10) Patent No.: US 11,135,877 B2
(45) Date of Patent: Oct. 5, 2021

(54) TIRE

(71) Applicant: SUMITOMO RUBBER INDUSTRIES, LTD., Hyogo (JP)

(72) Inventors: Tomoyuki Kujime, Hyogo (JP); Hiroshi Okagawa, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 307 days.

(21) Appl. No.: 16/106,842

(22) Filed: Aug. 21, 2018

(65) Prior Publication Data
US 2019/0084352 A1    Mar. 21, 2019

(30) Foreign Application Priority Data

Sep. 19, 2017  (JP) .............................. JP2017-178880
Dec. 25, 2017  (JP) .............................. JP2017-248056

(51) Int. Cl.
*B60C 11/03* (2006.01)
*B60C 11/12* (2006.01)

(52) U.S. Cl.
CPC ........ *B60C 11/0302* (2013.01); *B60C 11/032* (2013.01); *B60C 11/033* (2013.01);
(Continued)

(58) Field of Classification Search
CPC ................... B60C 11/0302; B60C 2011/0358
See application file for complete search history.

(56) References Cited

U.S. PATENT DOCUMENTS

2006/0137789 A1*  6/2006  Shirouzu ............... B60C 11/033
                                                                         152/209.8
2013/0133797 A1*  5/2013  Takagi .................. B60C 11/033
                                                                         152/209.8
(Continued)

FOREIGN PATENT DOCUMENTS

EP          2439083 A2     4/2012
EP          2777949 A2     9/2014
(Continued)

OTHER PUBLICATIONS

Search Report issued in European Patent Office (EPO) Patent Application No. 18190383.2, dated Mar. 4, 2019.

*Primary Examiner* — Robert C Dye
*Assistant Examiner* — Farah Taufiq
(74) *Attorney, Agent, or Firm* — Greenblum & Bernstein P.L.C.

(57)    ABSTRACT

A tire includes an outboard tread edge and an inboard tread edge to be located on an outboard side and an inboard side of a vehicle, respectively, circumferentially and continuously extending main grooves, and land portions divided by the main grooves. The land portions include an outboard shoulder land portion, an outboard middle land portion, an inboard shoulder land portion, and an inboard middle land portion. Each of the outboard shoulder land portion, the inboard shoulder land portion, and the inboard middle land portion is provided with axially extending lateral grooves. The outboard middle land portion is provided with outboard middle lateral grooves extending from an edge of the outboard middle land portion on the outboard tread edge side toward the inboard tread edge. The outboard middle lateral grooves are inclined with respect to a tire circumferential direction at angles smaller than those of the lateral grooves.

19 Claims, 12 Drawing Sheets

(52) U.S. Cl.
CPC ...... *B60C 11/0304* (2013.01); *B60C 11/0309* (2013.01); *B60C 11/12* (2013.01); *B60C 11/1272* (2013.01); *B60C 2011/036* (2013.01); *B60C 2011/0341* (2013.01); *B60C 2011/0348* (2013.01); *B60C 2011/0353* (2013.01); *B60C 2011/0355* (2013.01); *B60C 2011/0358* (2013.01); *B60C 2011/0365* (2013.01); *B60C 2011/0367* (2013.01); *B60C 2011/0372* (2013.01); *B60C 2011/0374* (2013.01); *B60C 2011/0376* (2013.01); *B60C 2011/0379* (2013.01)

(56) References Cited

U.S. PATENT DOCUMENTS

| | | | | |
|---|---|---|---|---|
| 2013/0186532 | A1* | 7/2013 | Kujime | B60C 11/033 152/209.8 |
| 2013/0192731 | A1* | 8/2013 | Oji | B60C 11/0302 152/209.8 |
| 2014/0261952 | A1* | 9/2014 | Tanaka | B60C 11/0304 152/535 |
| 2016/0152092 | A1* | 6/2016 | Sasaki | B60C 11/0304 152/209.18 |
| 2016/0185160 | A1* | 6/2016 | Mukai | B60C 11/1307 152/209.24 |
| 2016/0257172 | A1* | 9/2016 | Mukai | B60C 11/1392 |
| 2017/0050470 | A1* | 2/2017 | Kanematsu | B60C 11/1369 |
| 2017/0100965 | A1* | 4/2017 | Kikuchi | B60C 11/0304 |
| 2017/0210175 | A1* | 7/2017 | Yoshimura | B60C 11/12 |
| 2017/0267030 | A1 | 9/2017 | Suzuki et al. | |
| 2017/0305198 | A1 | 10/2017 | Ichimura | |

FOREIGN PATENT DOCUMENTS

| | | |
|---|---|---|
| JP | 2016-74386 A | 5/2016 |
| JP | 2016-101804 A | 6/2016 |
| WO | 01/02194 A1 | 1/2001 |
| WO | 2016/027647 A1 | 2/2016 |
| WO | 2018/207112 A1 | 11/2018 |
| WO | WO-2018207112 A1 * 11/2018 ........... B60C 11/033 |

* cited by examiner

TIRE

BACKGROUND ART

Field of the Disclosure

The present disclosure relates to tires, and more particularly to a tire capable of improving noise performance or steering stability while maintaining excellent ride comfort.

Description of the Related Art

Conventionally, the following patent document 1 discloses a tire which comprises a tread portion having a designated mounting direction to a vehicle. As to such a tire, in particular passenger car tires, further improvement regarding ride comfort, noise performance and steering stability has been required.

PATENT DOCUMENT

[Patent Document 1]
Japanese Unexamined Patent Application Publication 2016-101804

SUMMARY OF THE DISCLOSURE

In view of the above problems in the conventional art, the present disclosure has an object to provide a tire capable of improving noise performance or steering stability while maintaining excellent ride comfort.

According to a first aspect of the disclosure, a tire includes a tread portion having a designated mounting direction to a vehicle. The tread portion includes an outboard tread edge and an inboard tread edge to be located on an outboard side and an inboard side of a vehicle, respectively, upon being mounted on the vehicle, circumferentially and continuously extending main grooves, and land portions divided by the main grooves. The land portions include an outboard shoulder land portion including the outboard tread edge, an outboard middle land portion arranged adjacent to the outboard shoulder land portion, an inboard shoulder land portion including the inboard tread edge, and an inboard middle land portion arranged adjacent to the inboard shoulder land portion. Each of the outboard shoulder land portion, the inboard shoulder land portion, and the inboard middle land portion is provided with axially extending lateral grooves. The outboard middle land portion is provided with outboard middle lateral grooves extending from an edge of the outboard middle land portion located on the outboard tread edge side toward the inboard tread edge, wherein the outboard middle lateral grooves are inclined with respect to a tire circumferential direction at angles smaller than those of the lateral grooves.

According to a second aspect of the disclosure, a tire includes a tread portion having a designated mounting direction to a vehicle. The tread portion includes an outboard tread edge and an inboard tread edge to be located on an outboard side and an inboard side of a vehicle, respectively, upon being mounted on the vehicle, circumferentially and continuously extending main grooves, and land portions divided by the main grooves. The land portions include an outboard shoulder land portion including the outboard tread edge, an outboard middle land portion arranged adjacent to the outboard shoulder land portion, an inboard shoulder land portion including the inboard tread edge, and an inboard middle land portion arranged adjacent to the inboard shoulder land portion. Each of the outboard shoulder land portion, the inboard shoulder land portion, and the inboard middle land portion is provided with axially extending lateral grooves. The outboard middle land portion is provided with a circumferentially and continuously extending outboard middle longitudinal narrow groove having a groove width smaller than those of the main grooves to form a circumferentially extending inner land section on the inboard tread edge side of the outboard middle land portion, wherein the inner land section extends continuously in the tire circumferential direction.

In another aspect of the disclosure, the lateral grooves provided on each of the outboard shoulder land portion, the inboard shoulder land portion, and the inboard middle land portion may traverse the respective land portions completely.

In another aspect of the disclosure, when the tread portion is divided into an outboard tread portion between the outboard tread edge and a tire equator, and an inboard tread portion between the inboard tread edge and the tire equator, the outboard tread portion may have a land ratio greater than that of the inboard tread portion.

In another aspect of the disclosure, each of the outboard shoulder land portion, the inboard shoulder land portion, and the inboard middle land portion may further be provided with axially extending narrow lateral grooves traversing the respective land portions completely and having groove widths smaller than those of the lateral grooves.

In another aspect of the disclosure, the narrow lateral grooves may include one or more lateral sipes having an opening width of less than 1.5 mm on a ground contact surface of the tread portion.

In another aspect of the disclosure, the lateral grooves and the narrow lateral grooves may be arranged alternately in the tire circumferential direction on each of the outboard shoulder land portion, the inboard shoulder land portion, and the inboard middle land portion.

In another aspect of the disclosure, the land portions may further include a crown land portion between the outboard middle land portion and the inboard middle land portion, and the crown land portion may be provided with one or more outboard recesses extending from an edge of the crown land portion on the outboard tread edge side toward the inboard tread edge and terminating within the crown land portion.

In another aspect of the disclosure, the crown land portion may be provided with one or more inboard slots extending from an edge of the crown land portion on the inboard tread edge side toward the outboard tread edge and terminating within the crown land portion.

In another aspect of the disclosure, axial lengths of the inboard slots may be greater than axial lengths of the outboard recesses.

In another aspect of the disclosure, the crown land portion may be located on the tire equator, and the inboard slots terminate without traversing the tire equator.

In another aspect of the disclosure, the lateral grooves may include one or more inboard middle lateral grooves traversing the inboard middle land portion completely, and the respective inboard slots may be arranged so as to be continuous to the respective inboard middle lateral grooves smoothly through one of the main grooves.

In another aspect of the disclosure, the outboard middle land portion may be provided with a circumferentially and continuously extending outboard middle longitudinal narrow groove having a groove width smaller than those of the main grooves, and the outboard middle longitudinal narrow groove may be located on the inboard tread edge side with respect to an axial center location of the outboard middle land portion.

In another aspect of the disclosure, the outboard middle lateral grooves may terminate within the outboard middle land portion.

In another aspect of the disclosure, the main grooves may include an outboard shoulder main groove between the outboard shoulder land portion and the outboard middle land portion, and the outboard shoulder main groove may have a minimum groove width among the main grooves.

In another aspect of the disclosure, each of the outboard middle lateral grooves may include a first groove portion having a constant depth and a second groove portion having a depth gradually decreasing toward the inboard tread edge.

In another aspect of the disclosure, the first groove portion may be in communication with the outboard shoulder main groove.

In another aspect of the disclosure, the second groove portion may include a portion having a depth greater than the constant depth of the first groove portion.

In another aspect of the disclosure, the lateral grooves may include inboard middle lateral grooves traversing the inboard middle land portion and inboard shoulder lateral grooves traversing the inboard shoulder land portion, and the respective inboard shoulder lateral grooves may be arranged to be continuous to the respective inboard middle lateral grooves smoothly through one of the main grooves.

In another aspect of the disclosure, a maximum angle of the inboard shoulder lateral grooves with respect to the tire axial direction may be smaller than a maximum angle of the inboard middle lateral grooves with respect to the tire axial direction.

DESCRIPTION OF THE PREFERRED EMBODIMENTS

An embodiment of the present invention will be explained below with reference to the accompanying drawings.

Figure 1:
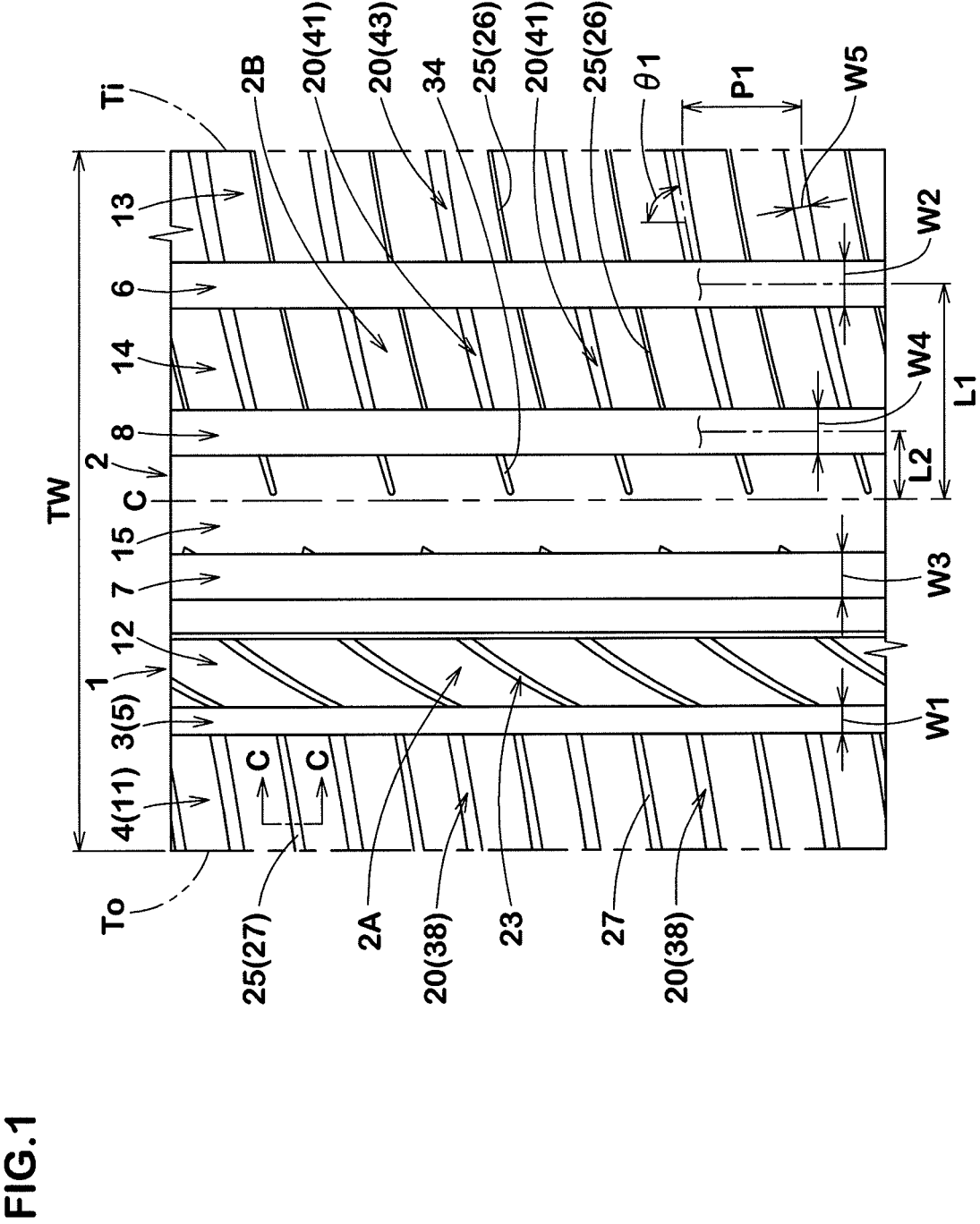
FIG. 1 is a development view of a tread portion of a tire in accordance with an embodiment of the disclosure.

FIG. 1 is a development view of a tread portion 2 of a tire 1 in accordance with an embodiment of the disclosure.

The tire 1 according to the disclosure is preferably embodied as a passenger car tire. It is needless to say, the present disclosure cannot be limited to such an aspect but can be embodied as various categorized tires such as heavy-duty pneumatic tires, or non-pneumatic tires that can support the tire load by structural members without being inflated with a pressurized air.

As illustrated in FIG. 1, the tire 1 includes a tread portion 2 having a designated mounting direction to a vehicle. In this embodiment, the tread portion 2, for example, is configured as an asymmetrical tread pattern with respect to the tire equator C.

The tread portion 2 includes an outboard tread edge (To) and an inboard tread edge Ti to be located on an outboard side and an inboard side of a vehicle, respectively, upon being mounted on the vehicle. The mounting direction to a vehicle, for example, may be indicated on a sidewall portion (not illustrated) by a mark or character.

When the tire is a pneumatic tire, the respective tread edges (To) and Ti are defined as axially outermost edges of the ground contacting patch of the tread portion 2 which occurs under a normal state with a standard tire load when the camber angle of the tire is zero, wherein the normal state is such that the tire is mounted on a standard wheel rim with a standard pressure but is loaded with no tire load. Unless otherwise noted, dimensions of respective portions of the tire are values measured under the normal state.

The standard wheel rim is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

The standard pressure is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The standard tire load is a tire load officially approved for each tire by standards organizations in which the tire is based, wherein the standard tire load is the "maximum load capacity" in JATMA, the maximum value given in the above-mentioned table in TRA, the "Load Capacity" in ETRTO, for example.

The tread portion 2 includes a plurality of circumferentially and continuously extending main grooves 3, and a plurality of land portions divided by the main grooves 3.

Each of the main grooves 3, for example, has a groove width equal to or more than 2% of the tread width TW which is an axial distance between the outboard tread edges (To) and the inboard tread edge Ti under the normal state. In this embodiment, the tread portion 2, for example, includes four main grooves 3 and five land portions 4 divided by the four main grooves 3. Note that the present disclosure is not limited to such an aspect.

The main grooves 3, for example, includes an outboard shoulder main groove 5, an inboard shoulder main groove 6, an outboard crown main groove 7, and an inboard crown main groove 8. The outboard shoulder main groove 5 is provided on a location nearest to the outboard tread edge (To) among the main grooves 3. The inboard shoulder main groove 6 is provided on a location nearest to the inboard tread edge Ti among the main grooves 3. The outboard crown main groove 7, for example, is provided between the outboard shoulder main groove 5 and the tire equator C. The inboard crown main groove 8, for example, is provided between the inboard shoulder main groove 6 and the tire equator C.

Regarding the outboard shoulder main groove 5 and the inboard shoulder main groove 6, axial distances L1 from the tire equator C to the respective groove centerlines are preferably in a range of from 0.25 to 0.35 times the tread width TW, for example. Regarding the outboard crown main groove 7 and the inboard crown main groove 8, axial distances L2 from the tire equator C to the respective groove centerlines are preferably in a range of from 0.05 to 0.15 times the tread width TW, for example.

In some preferred embodiments, the outboard shoulder main groove 5 has the minimum groove width W1 among the main grooves. Preferably, the groove width W1 of the outboard shoulder main groove 5, for example, is in a range of from 4.0% to 6.0% of the tread width TW. Preferably, the groove width W1 of the outboard shoulder main groove 5, for example, is in a range of from 0.50 to 0.65 times the maximum groove width of the main grooves 3. Preferably, groove widths W2, W3 and W4 of the inboard shoulder main groove 6, the outboard crown main groove 7 and the inboard crown main groove 8, respectively, are in a range of from 5.5% to 7.5% of the tread width TW. Preferably, each of the main grooves 5 to 8, for example, have a groove depth of from 5.0 to 12.0 mm. In some preferred embodiments, the outboard shoulder main groove 5 may have a minimum groove depth among the main grooves.

The land portions 4 include an outboard shoulder land portion 11, an outboard middle land portion 12, an inboard shoulder land portion 13, and an inboard middle land portion 14. Furthermore, in this embodiment, the land portions 4 include a crown land portion 15. The outboard shoulder land portion 11 is located nearest to the outboard tread edge (To) side among the land portions 4 to include the outboard tread edge (To). The inboard shoulder land portion 13 is located nearest to the inboard tread edge Ti side among the land portions 4 to include the inboard tread edge Ti. The outboard middle land portion 12 is adjacent to the outboard shoulder land portion 11. The inboard middle land portion 14 is adjacent to the inboard shoulder land portion 13. The crown land portion 15 is located between the outboard middle land portion 12 and the inboard middle land portion 14.

Each of the outboard shoulder land portion 11, the inboard shoulder land portion 13 and the inboard middle land portion 14 is provided with axially extending lateral grooves 20. The lateral grooves 20, for example, have groove widths W5 in a range of from 1.0% to 2.0% of the tread width TW. The lateral grooves 20, for example, have groove depths of from 3.0 to 8.0 mm. The lateral grooves 20, for example, are inclined at angles θ1 of from 75 to 90 degrees with respect to the tire circumferential direction.

The lateral grooves 20 are arranged at circumferential pitches P1 which are preferably equal to or more than 0.10 times, more preferably equal to or more than 0.12 times the tread width TW, but preferably equal to or less than 0.20 times, more preferably equal to or less than 0.18 times the tread width TW. The lateral grooves 20 as such may be helpful to improve ride comfort as well as steering stability in a well-balanced manner. Note that the details of the lateral grooves 20 provided on each land portion will be described later.

Figure 2:
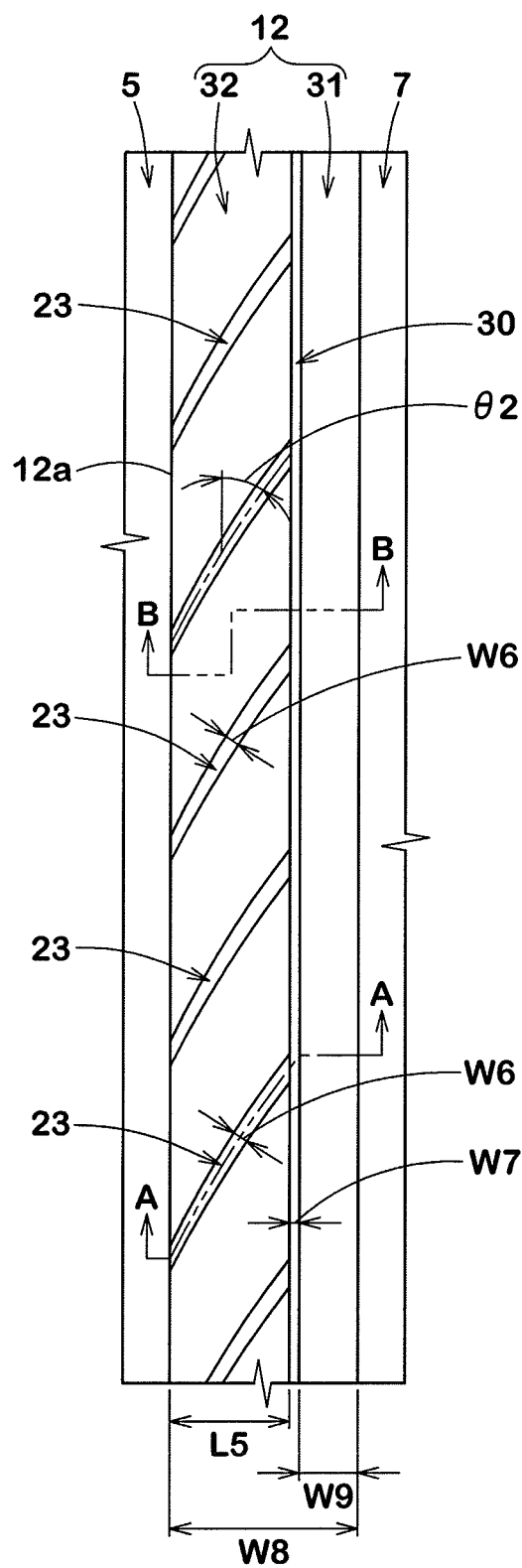
FIG. 2 is an enlarged view of an outboard middle land portion in FIG. 1.

FIG. 2 illustrates an enlarged view of the outboard middle land portion 12. As illustrated in FIG. 2, in the first aspect of the disclosure, the outboard middle land portion 12 is provided with a plurality of outboard middle lateral grooves 23 extending toward the inboard tread edge Ti from an edge 12a of the outboard middle land portion 12 on the outboard tread edge (To) side. Each of the outboard middle lateral grooves 23, with respect to the tire circumferential direction, is inclined at an angle θ2 which is smaller than the angles θ1 of the lateral grooves 20. Since the outboard middle lateral grooves 23 as such, during traveling, generate a sound with a frequency band which is different from that of the lateral grooves 20, the tire may generate a white noise by which these sounds are mixed.

When an initial stage of cornering, there is a tendency that a larger ground contact pressure acts on the outboard middle land portion 12 compared to the outboard shoulder land portion 11. Furthermore, when a middle stage of cornering, there is a tendency that a larger ground contact pressure acts on the outboard middle land portion 12 compared to the inboard shoulder land portion 13 and the inboard middle land portion 14. Thus, the outboard middle lateral grooves 23 tend to have a big impact to initial steering response as well as steering stability. In this embodiment, portions around the outboard middle lateral grooves 23 of the outboard middle land portion 12 may be reduced in rigidity. Thus, the portions can follow up flexibly the ground to improve steering response even in an initial stage of cornering where the ground contact pressure acting on the outboard middle land portion 12 is not sufficiently increased.

In some preferred embodiments, the angle θ2, with respect to the tire circumferential direction, of each outboard middle lateral groove 23 measured in an entire region thereof is smaller than the minimum angle with respect to the tire circumferential direction of the other lateral grooves 20. In some preferred embodiments, an angle of each outboard middle lateral groove 23 with respect to the tire circumferential direction measured using a straight line connecting both ends of the groove centerline of the outboard middle lateral groove 23 is smaller than the minimum angle with respect to the tire circumferential direction of the other lateral grooves 20.

In order to further improve the above effect, the angle θ2 of each outboard middle lateral groove 23 is preferably of from 30 to 45 degrees. Furthermore, the angle θ2 of each outboard middle lateral groove 23 preferably decreases gradually toward the outboard tread edge (To).

Preferably, the outboard middle lateral grooves 23 each have a groove width W6 in a range of from 0.8% to 1.6% of the tread width TW to improve ride comfort and steering stability in a well-balanced manner.

Preferably, the outboard middle lateral grooves 23, for example, terminate within the outboard middle land portion 12. The outboard middle lateral grooves 23 as such make a small pumping noise during traveling.

In the same point of view, the outboard middle lateral grooves 23 each preferably have an axial length L5 in a range of from 0.50 to 0.80 times an axial width W8 of the outboard middle land portion 12.

Figure 3A:
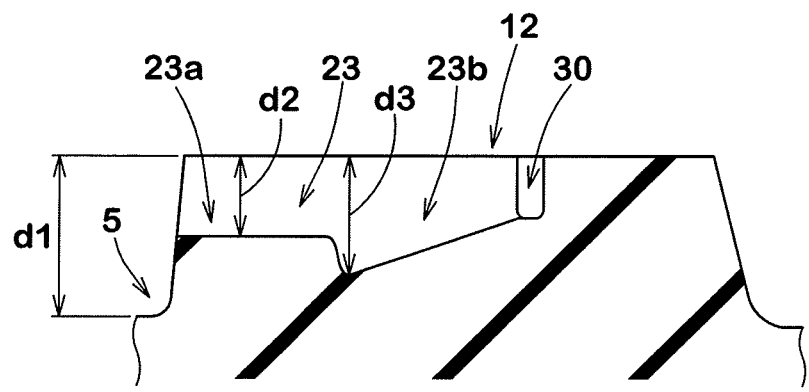
FIGS. 3A and 3B are cross-sectional views taken along lines A-A and B-B of FIG. 2, respectively.

FIG. 3A illustrates a cross-sectional view of one outboard middle lateral groove 23 taken along line A-A of FIG. 2. As illustrated in FIG. 3A, each outboard middle lateral groove 23, for example, includes a first groove portion 23a and a second groove portion 23b. The first groove portion 23a, for example, is in communication with the outboard shoulder main groove 5 and extends in a constant depth. The second groove portion 23b is connected to the first groove portion 23a, and decreases in depth toward the inboard tread edge Ti.

Preferably, a depth d2 of the first groove portion 23a, for example, is in a range of from 0.45 to 0.55 times the groove depth d1 of the outboard shoulder main groove 5 to improve wear resistance and steering stability in a well-balanced manner.

The second groove portion 23b, for example, includes a portion having a depth d3 deeper than that of the first groove portion 23a. The maximum groove depth d3 of the second groove portion 23b, for example, is in a range of from 1.40 to 1.60 times the depth d2 of the first groove portion 23a. In this embodiment, the second groove portion 23b constitutes a portion which decreases in depth from the deepest location of the outboard middle lateral groove 23 toward the inboard tread edge Ti.

As illustrated in FIG. 2, in the second aspect of the disclosure, the outboard middle land portion 12 is provided with a circumferentially and continuously extending outboard middle longitudinal narrow groove 30 having a groove width smaller than those of the main grooves to form a circumferentially extending inner land section 31 on the inboard tread edge Ti side of the outboard middle land portion, wherein the inner land section 31 extends continuously in the tire circumferential direction. Furthermore, the outboard middle land portion 12 includes an outer land section 32 on the outboard tread edge (To) side of the outboard middle longitudinal narrow groove 30, and the outer land section 32 is provided with the plurality of outboard middle lateral grooves 23. The inner land section 31 may improve in rigidity of the outboard middle land portion 12 suitably, improving steering stability.

In this embodiment, the outboard middle land portion 12 is configured to include both structures of the first aspect and the second aspect. Thus, the tire according to the embodiment can improve noise performance as well as steering stability while maintaining excellent ride comfort.

In this embodiment, each of the outboard middle lateral grooves 23, for example, is in communication with the outboard middle longitudinal narrow groove 30. Thus, rigidity of the outer land section 32 can further be reduced to further improve ride comfort.

The outboard middle longitudinal narrow groove 30, for example, extends in a straight shape in parallel with the tire circumferential direction. In this embodiment, the outboard middle longitudinal narrow groove 30, for example, is located on the inboard tread edge Ti side with respect to the axial center location of the outboard middle land portion 12. Note that the outboard middle longitudinal narrow groove 30 is not limited to such an aspect.

The outboard middle longitudinal narrow groove 30, for example, has a groove width W7 of less than 2% of the tread width TW. Preferably, the groove width W7 of the outboard middle longitudinal narrow groove 30 is in a range of from 0.5% to 1.0% of the tread width TW. Further, the groove width W7 of the outboard middle longitudinal narrow groove 30 may preferably be in a range of 3% to 10% of the axial width W8 of the outboard middle land portion 12. More specifically, the groove width W7, for example, may be in a range of from 0.8 to 2.0 mm.

Figure 3B:
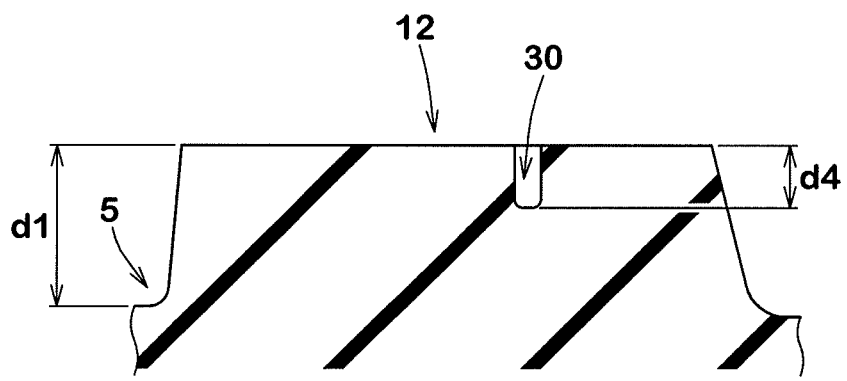

FIG. 3B illustrates a cross-sectional view of the outboard middle longitudinal narrow groove 30 taken along line B-B of FIG. 2. As illustrated in FIG. 3B, a groove depth d4 of the outboard middle longitudinal narrow groove 30 is preferably in a range of from 0.30 to 0.45 times the groove depth d1 of the outboard shoulder main groove 5 to improve wear resistance as well as steering stability in a well-balanced manner.

As illustrated in FIG. 2, in this embodiment, the inner land section 31, for example, is preferably configured as a plain rib that is not provided with any sipes nor grooves. The inner land section 31 as such can exert an excellent steering stability and reduce air column noise by suppressing deformation of groove walls of the outboard crown main groove 7.

In order to improve initial steering response and wear resistance in a well-balanced manner, an axial width W9 of the inner land section 31 is preferably in a range of from 0.20 to 0.40 times, more preferably 0.25 to 0.35 times the axial width W8 of the outboard middle land portion 12.

As illustrated in FIG. 1, preferably, each of the outboard shoulder land portion 11, the inboard shoulder land portion 13 and the inboard middle land portion 14 is further provided with axially extending narrow lateral grooves 25 traversing the respective land portions completely and having groove widths smaller than those of the lateral grooves 20. In some preferred embodiments, one or more land portions, the lateral grooves 20 and the narrow lateral grooves 25 are arranged alternately in the tire circumferential direction to improve ride comfort further.

Preferably, the narrow lateral grooves 25, for example, include one or more lateral sipes 26 having an opening width of less than 1.5 mm on a ground contact surface of the tread portion 2. In this embodiment, the narrow lateral grooves 25 provided on the inboard shoulder land portion 13 and the inboard middle land portion 14 are configured as the above mentioned lateral sipes 26. On the other hand, the narrow lateral grooves 25 provided on the outboard shoulder land portion 11 have opening widths of equal to or more than 1.5 mm on the ground contact surface of the tread portion 2. Such an arrangement of the narrow lateral grooves 25 may improve ride comfort and steering stability in a well-balanced manner while suppressing excessive reduction in rigidity of the inboard shoulder land portion 13 and the inboard middle land portion 14. In this specification and claims, a sipe shall mean a narrow cut having a width of less than 1.5 mm.

The lateral narrow grooves 25 include a plurality of outboard shoulder lateral narrow grooves 27 provided on the outboard shoulder land portion 11, and the lateral narrow grooves 27 preferably have opening widths on the tread ground contact surface of the tread portion 2 increasing gradually toward the outboard tread edge (To).

Figure 4:
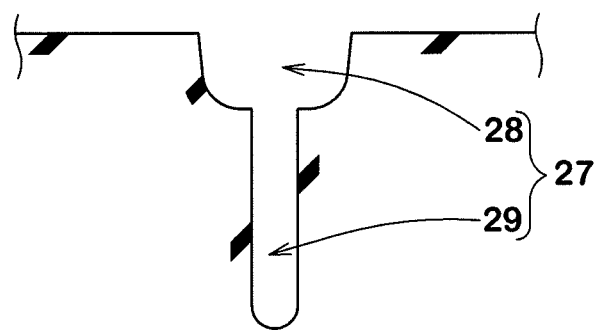
FIG. 4 is a cross-sectional view taken along line C-C of FIG. 1.

FIG. 4 illustrates a cross-sectional view of one outboard shoulder lateral narrow groove 27 taken along line C-C of FIG. 1. In this embodiment, each of the outboard shoulder lateral narrow grooves 27, for example, includes an opening portion 28 having the above-mentioned opening width, and a sipe portion 29 extending radially inwardly from the opening portion 26 and having a width of less than 1.5 mm. Thus, each outboard shoulder lateral narrow groove 27 can suppress excessive reduction in rigidity of the outboard shoulder land portion 11, improving ride comfort and steering stability in a well-balanced manner.

Figure 5:
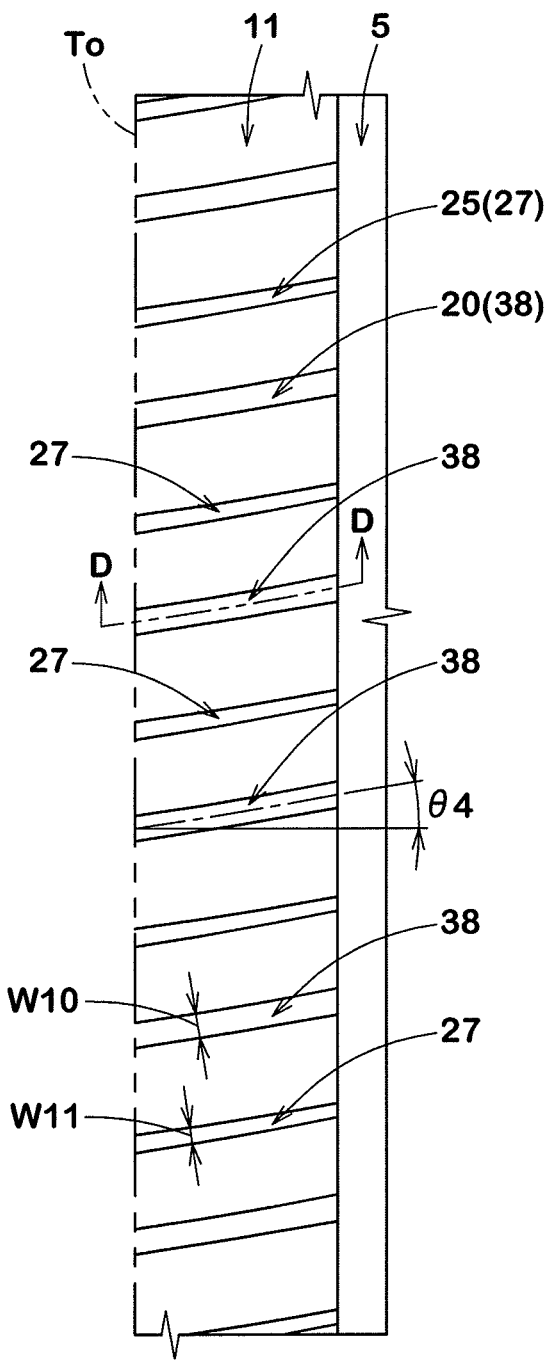
FIG. 5 is an enlarged view of an outboard shoulder land portion of FIG. 1.

FIG. 5 illustrates an enlarged view of the outboard shoulder land portion 11. As illustrated in FIG. 5, the outboard shoulder land portion 11 is provided with a plurality of axially extending outboard shoulder lateral grooves 38, and some outboard shoulder lateral narrow grooves 27. In some preferred embodiments, the outboard shoulder lateral grooves 38 and the outboard shoulder lateral narrow grooves 27 are arranged alternately in the tire circumferential direction.

The outboard shoulder lateral grooves 38, for example, travers the outboard shoulder land portion 11 completely. The outboard shoulder lateral grooves 38, for example, are inclined in the same direction with respect to the tire axial direction as the outboard middle lateral grooves 23. Preferably, angles θ4 with respect to the tire axial direction of the outboard shoulder lateral grooves 38, for example, are of from 5 to 15 degrees.

Preferably, the groove widths W10 of the outboard shoulder lateral grooves 38, for example, are greater than the groove widths W6 (as illustrated in FIG. 2) of the outboard middle lateral grooves 23. Preferably, the groove widths W10 of the outboard shoulder lateral grooves 38, for example, are in a range of from 1.30 to 1.70 times the groove width W6 of the outboard middle lateral grooves 23 in order to improve wet performance and steering stability in a well-balanced manner.

Figure 6:
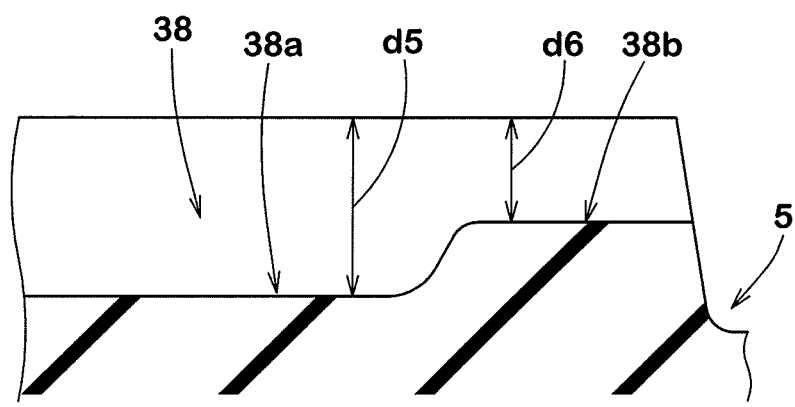
FIG. 6 is a cross-sectional view taken along line D-D of FIG. 5.

FIG. 6 illustrates a cross-sectional view of one outboard shoulder lateral grooves 38 taken along line D-D of FIG. 5. As illustrated in FIG. 6, each of the outboard shoulder lateral grooves 38, for example, includes a first groove portion 38a on the outboard tread edge (To) side, and a second groove portion 38b connected to the outboard shoulder main groove 5 and having a depth smaller than that of the first groove portion 38a. The depth d6 of the second groove portion 38b, for example, is in a range of from 0.60 to 0.75 times the depth d5 of the first groove portion 38a. The outboard shoulder lateral grooves 38 may suppress deformation of a land portion around the second groove portion 38b to improve steering stability, while facilitating deformation of a land portion around the first groove portion 38a to improve initial steering response.

As illustrated in FIG. 5, the outboard shoulder lateral narrow grooves 27, for example, are inclined in the same direction as the outboard shoulder lateral grooves 38. In this embodiment, the outboard shoulder lateral narrow grooves 27 extend along, e.g., in parallel with, the outboard shoulder lateral grooves 38.

Preferably, groove widths W11 of the outboard shoulder lateral narrow grooves 27, for example, are in a range of from 0.40 to 0.60 times the groove widths W10 of the outboard shoulder lateral grooves 38. Note that the outboard shoulder lateral narrow grooves 27 are not limited to such an aspect but may be configured as sipes.

Figure 7:
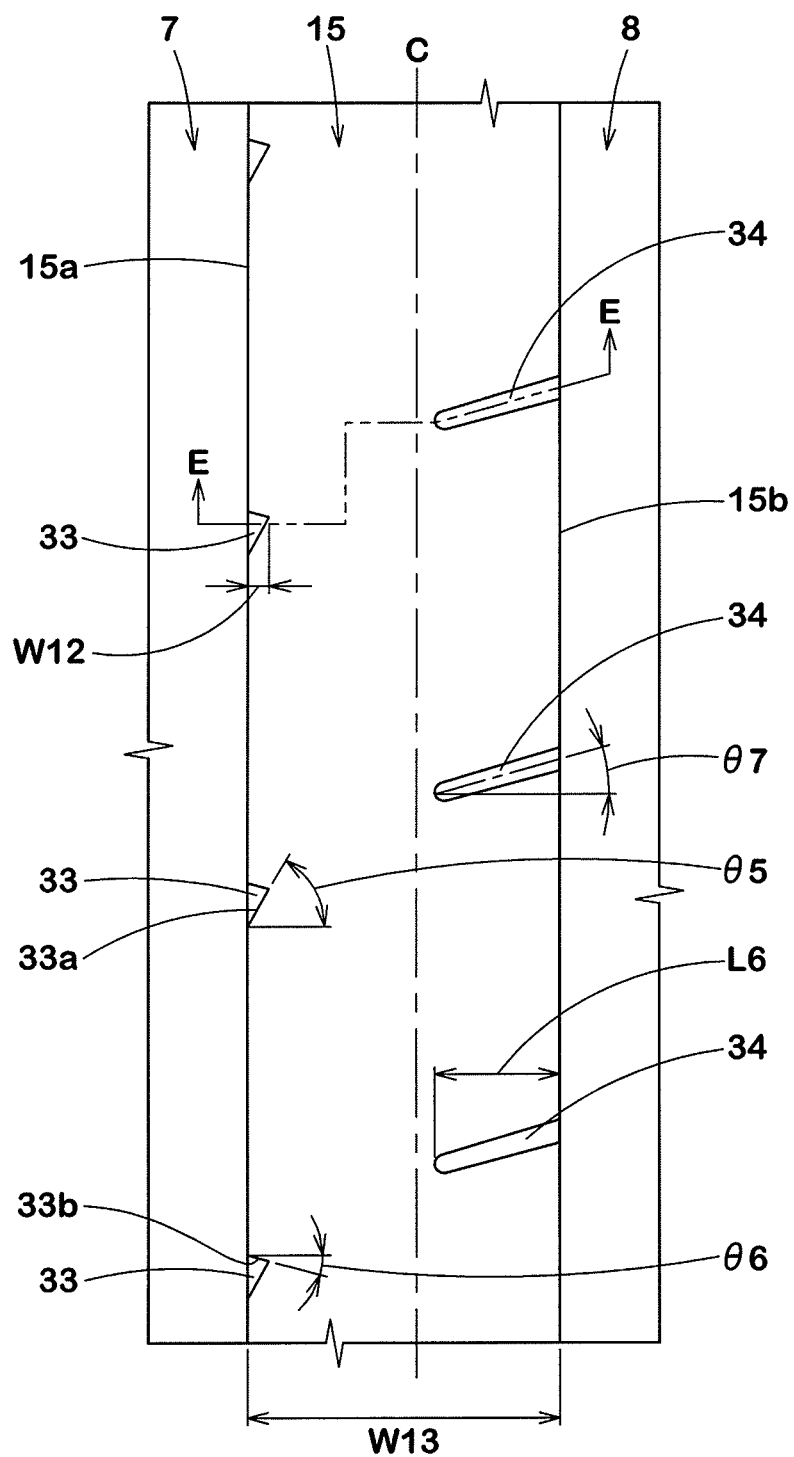
FIG. 7 is an enlarged view of a crown land portion of FIG. 1.

FIG. 7 illustrates an enlarged view of the crown land portion 15. As illustrated in FIG. 7, the crown land portion 15, for example, extends continuously in the tire circumferential direction. The crown land portion 15 as such, in concert with the above mentioned inner land section 31 of outboard middle land portion 12, improves rigidity of the tread portion 2 around the tire equator C, delivering large cornering force upon cornering.

Preferably, the crown land portion 15 is provided with a plurality of outboard recesses 33 and a plurality of inboard slots 34. In this embodiment, the outboard recesses 33 and the inboard slots 34 are arranged at circumferential pitches same as the outboard middle lateral grooves 23. The outboard recesses 33 are provided on an edge 15 of the crown land portion 15 on the outboard tread edge (To) side and extend toward the inboard tread edge Ti. The inboard slots 34 are provided on an edge 15b of the crown land portion 15 on the inboard tread edge Ti side and extend toward the outboard tread edge (To) without reaching the edge 15a. The outboard recesses 33 and the inboard slots 34 may reduce impact noise when the crown land portion 15 comes into contact with the ground, improving noise performance.

Each of the outboard recesses 33, for example, includes a first edge 33a and a second edge 33b on the ground contact surface of the crown land portion 15, and these edges 33a and 33b are inclined in an opposite direction from each other. The first edge 33a, for example, are inclined at an angle θ5 of from 50 to 70 degrees with respect to the tire axial direction. The second edge 33b, for example, is inclined at an angle θ6 with respect to the tire axial direction, and the angle θ6 is smaller than that of the first edge 33a. Specifically, the angle θ6 of the second edge 33b, for example, is of from 0 to 10 degrees.

Preferably, axial lengths W12 of the outboard recesses 33 are smaller than the axial width W9 (as illustrated in FIG. 2) of the inner land section 31 of the outboard middle land portion 12. The outboard recesses 33 as such may be useful such that the crown land portion 15 and the outboard middle land portion 12 are worn similarly, improving uneven wear resistance.

Preferably, the inboard slots 34 are inclined in the same direction with respect to the tire axial direction as the outboard middle lateral grooves 23. Preferably, angles θ7 with respect to the tire axial direction of the inboard slots 34 are of from 10 to 25 degrees.

Preferably, axial lengths L6 of the inboard slots 34 are greater than the axial lengths W12 of the outboard recesses 33. In this embodiment, the crown land portion 15 is provided on the tire equator C, and the inboard slots 34 are arranged so as not to traverse the tire equator C. More specifically, the axial lengths L6 of inboard slots 34 are preferably in a range of from 0.30 to 0.50 times an axial width W13 of the crown land portion 15. The inboard slots 34 as such may facilitate deformation of the crown land portion 15, improving initial steering response.

In some preferred embodiments, the axial lengths L6 of the inboard slots 34 may be smaller than the axial lengths L5 (as illustrated in FIG. 2) of the outboard middle lateral grooves 23. Preferably, the axial lengths L6 of the inboard slots 34 are in a range of from 0.45 to 0.65 times the axial lengths L5 of the outboard middle lateral grooves 23. The inboard slots 34 as such may be useful such that the crown land portion 15 and the outboard middle land portion 12 are worn similarly, improving uneven wear resistance.

Preferably, the axial lengths W12 of the outboard recesses 33 are smaller than the axial lengths L6 of the inboard slots 34. Preferably, the axial lengths W12 of the outboard recesses 33 are equal to or more than 0.15 times, more preferably equal to or more than 0.20 times the axial lengths L6 of the inboard slots 34, but preferably equal to or less than 0.30 times, more preferably equal to or less than 0.25 times the axial lengths L6 of the inboard slots 34, in order to reduce impact noise when the crown land portion 15 comes into contact with the ground, while maintaining steering stability.

Figure 8:
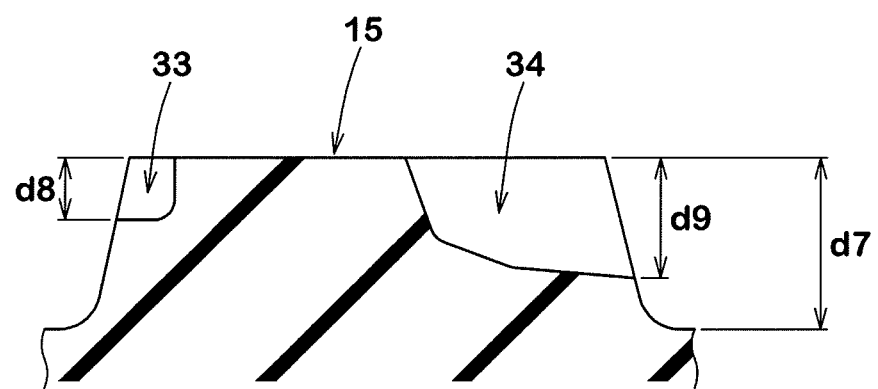
FIG. 8 is a cross-sectional view taken along line E-E of FIG. 8.

FIG. 8 illustrates a cross-sectional view of one outboard recess 33 and one inboard slot 34 taken along line E-E of FIG. 8. As illustrated in FIG. 8, each of the outboard recesses 33 has a maximum depth d8 which is preferably in a range of from 0.25 to 0.47 times the maximum depth d7 of the main grooves.

Preferably, the depth of each inboard slot 34 increases toward the inboard tread edge Ti. In this embodiment, the maximum depth d9 of each inboard slot 34, for example, is deeper than the maximum depth d8 of the outboard recesses 33. Preferably, the maximum depth d9 of each inboard slot 34 is in a range of from 1.30 to 1.70 times the depths d2 (as illustrated in FIG. 3A) of the first groove portions 23a of the outboard middle lateral grooves 23 in order to improve initial steering response and wear resistance in a well-balanced manner.

Figure 9:
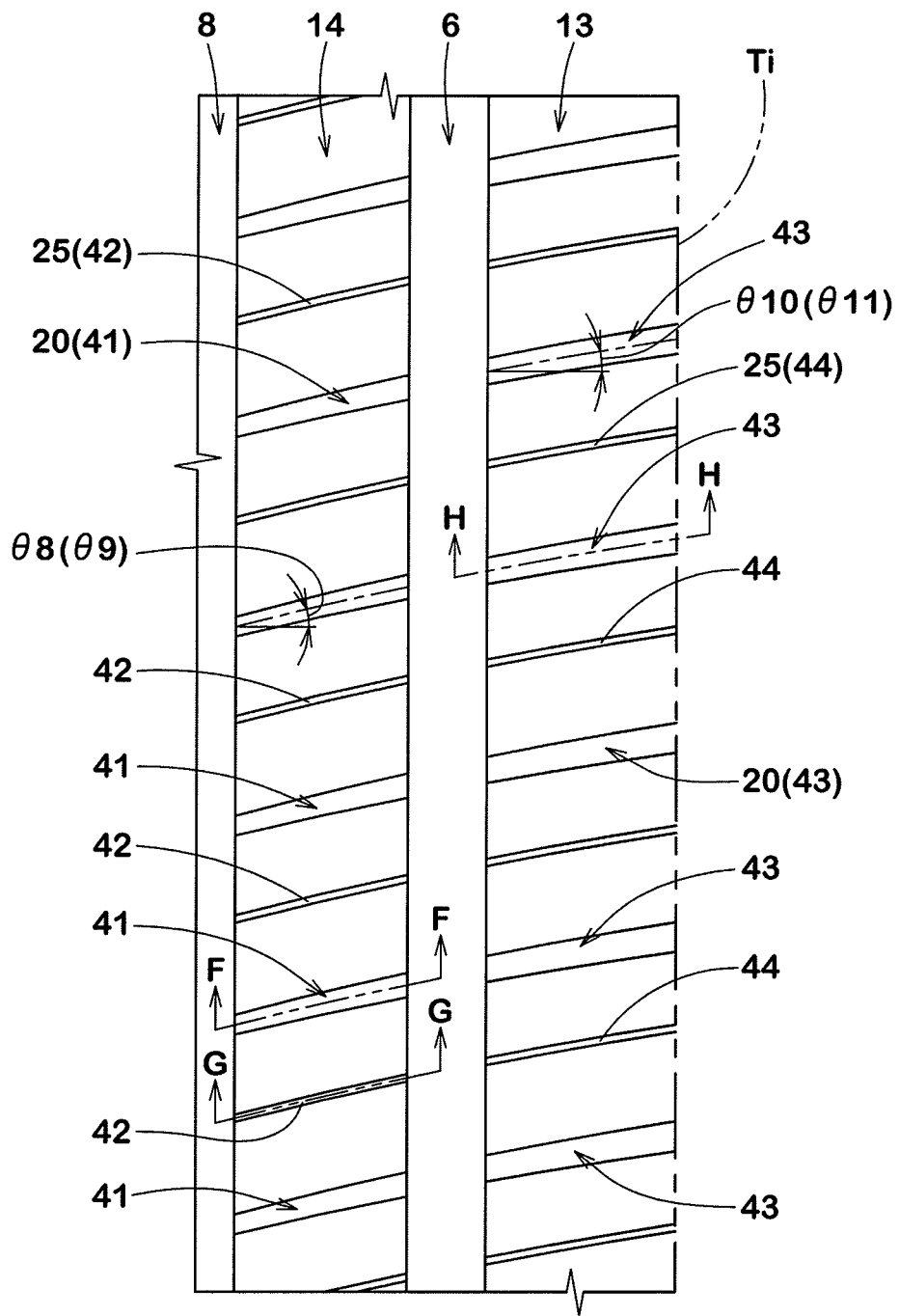
FIG. 9 is an enlarged view of an inboard middle land portion and an inboard shoulder land portion of FIG. 1.

FIG. 9 illustrates an enlarged view of the inboard middle land portion 14 and the inboard shoulder land portion 13. As illustrated in FIG. 9, the inboard middle land portion 14, for example, is provided with a plurality of inboard middle lateral grooves 41 and a plurality of the inboard middle sipes 42. In this embodiment, the inboard middle lateral grooves 41 and the inboard middle sipes 42 are arranged alternately in the tire circumferential direction.

The inboard middle lateral grooves 41, for example, traverse the inboard middle land portion 14 completely. The inboard middle lateral grooves 41, for example, are inclined in the same direction with respect to the tire axial direction as the inboard slots 34. Preferably, angles θ8 with respect to the tire axial direction of the inboard middle lateral grooves 41 are in a range of from 10 to 18 degrees.

In this embodiment, each inboard middle lateral groove 41 is slightly curved such that an angle of the groove centerline with respect to the tire axial direction decreases gradually toward the inboard tread edge Ti. The maximum angle θ9 of each inboard middle lateral groove 41, e.g. an angle at an end on the outboard tread edge (To) side, is in a range of from 0.20 to 0.30 times the angle of the outboard middle lateral grooves 23 with respect to the tire axial direction. Thus, axial rigidity of a land portion around the inboard middle lateral grooves 41 can be increased, generating large cornering force when a middle stage of cornering.

As illustrated in FIG. 1, the respective inboard middle lateral grooves 41 are preferably continuous to the respective inboard slots 34 smoothly through the inboard crown main groove 8, thereby exerting an excellent drainage performance in concert with the inboard slots 34. Note that "a groove and a slot are continuous smoothly" should be understood to include at least an aspect that a region in which the groove is virtually expanded to the slot overlaps a region in which the slot is virtually expanded to the groove. In this embodiment, the respective regions in which the respective inboard middle lateral grooves 41 are virtually expanded overlap the respective ends on the inboard crown main groove 8 side of the respective inboard slots 34. Further, the respective regions in which the respective inboard slots 34 are virtually expanded overlap the respective ends on the inboard crown main groove 8 side of the respective inboard middle lateral grooves 41.

Figure 10A:
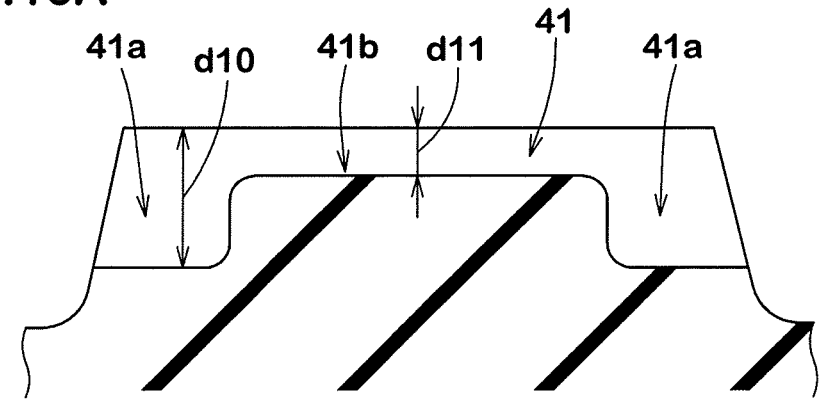
FIGS. 10A, 10B and 10C are cross-sectional views taken along lines F-F, G-G and H-H of FIG. 9, respectively.

FIG. 10A illustrates a cross-sectional view of one inboard middle lateral groove 41 taken along line F-F of FIG. 8. As illustrated in FIG. 10A, each of the inboard middle lateral grooves 41 includes a shallow bottom groove portion 41b which is located between axially both end portions 41a thereof and has a depth d11 shallower than depths d10 of the end portions 41a. The depth d11 of the shallow bottom groove portion 41b, for example, is in a range of from 0.30 to 0.40 times the depths d10 of the end portions 41a. The inboard middle lateral grooves 41 as such improve wet performance while maintaining the inboard middle land portion 14.

As illustrated in FIG. 9, the inboard middle sipes 42, for example, traverse the inboard middle land portion 14 completely. The inboard middle sipes 42 are inclined with respect to the tire axial direction same as the inboard middle lateral grooves 41, more preferably extending along, e.g. in parallel with the inboard middle lateral grooves 41.

Figure 10B:
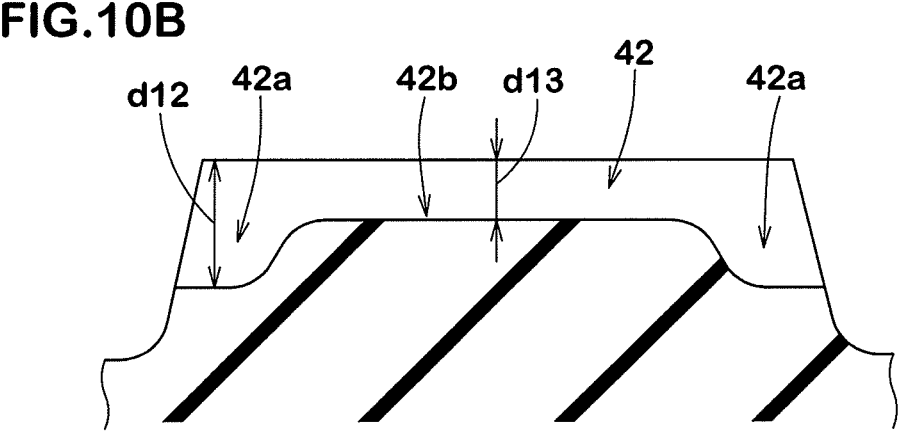

FIG. 10B illustrates a cross-sectional view taken along line G-G of FIG. 9. As illustrated in FIG. 10B, each of the inboard middle sipes 42, for example, includes a shallow bottom sipe portion 42b which is located between axially both end portions 42a thereof and has a depth d13 shallower than depths d12 of the end portions 42a. The depth d13 of the shallow bottom sipe portion 42b, for example, is of from 0.40 to 0.55 times the depths d12 of the end portions 42a.

The inboard middle sipes 42 as such may improve initial steering response and wear resistance in a well-balanced manner.

In some preferred embodiments, the depths d12 of the end portions 42a of the inboard middle sipes 42 are shallower than the depths d10 of the end portions 41a of the inboard middle lateral grooves 41. On the other hand, the depth d13 of the shallow bottom sipe portion 42b is deeper than the depth d11 of the shallow bottom groove portion 41b of each inboard middle lateral groove 41. The inboard middle lateral grooves 41 as well as the inboard middle sipes 42 may suppress uneven wear of the inboard middle land portion 14.

As illustrated in FIG. 9, the inboard shoulder land portion 13, for example, is provided with a plurality of inboard shoulder lateral grooves 43 and a plurality of inboard shoulder sipes 44. In this embodiment, the inboard shoulder lateral grooves 43 and the inboard shoulder sipes 44 are arranged alternately in the tire circumferential direction.

The inboard shoulder lateral grooves 43, for example, traverse the inboard shoulder land portion 13 completely. The inboard middle lateral grooves 41, for example, are inclined with respect to the tire axial direction in the same direction as the inboard middle lateral grooves 41. Preferably, an angle θ10 of each inboard shoulder lateral groove 43 with respect to the tire axial direction is less than 10 degrees, for example.

In this embodiment, each inboard shoulder lateral grooves 43 is slightly curved such that an angle of the groove centerline with respect to the tire axial direction decreases gradually toward the inboard tread edge Ti. Preferably, the maximum angle θ11 of each inboard shoulder lateral grooves 43, e.g. an angle at an end on the inboard tread edge (To) side, is smaller than the maximum angle θ9 of the inboard middle lateral grooves 41 with respect to the tire axial direction.

Preferably, the respective inboard shoulder lateral grooves 43 are continuous to the respective inboard middle lateral grooves 41 smoothly through the inboard shoulder main groove 6. In this embodiment, the respective regions in which the respective inboard shoulder lateral grooves 43 are expanded overlap the respective ends of the inboard middle lateral grooves 41 on the inboard shoulder main groove 6 side. Furthermore, the respective regions in which the respective inboard middle lateral grooves 41 are expanded overlap the respective ends of the inboard shoulder lateral grooves 43 on the inboard shoulder main groove 6 side. These inboard shoulder lateral grooves 43 may exert an excellent drainage performance.

In this embodiment, the inboard slots 34, the inboard middle lateral grooves 41, and the inboard shoulder lateral grooves 43 are continuous smoothly through two main grooves to form long combination grooves, and each of the combination grooves has an angle so as to decrease gradually from axially inner ends of the inboard slots 34 to the inboard tread edge Ti. These combination grooves may be useful to improve wet performance.

Figure 10C:
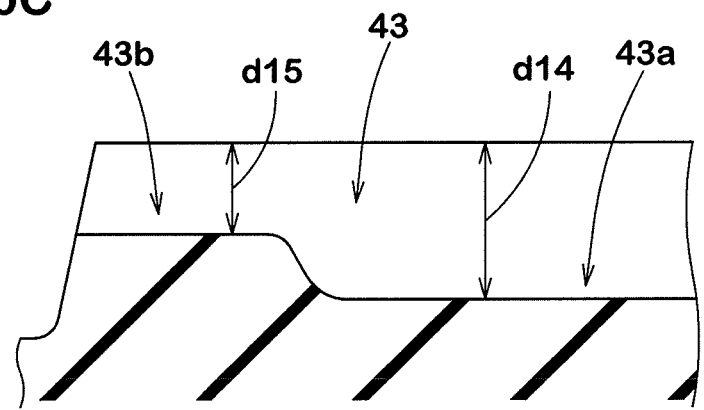

FIG. 10C illustrates a cross-sectional view of one inboard shoulder lateral groove taken along line H-H of FIG. 9. As illustrated in FIG. 10C, each of the inboard shoulder lateral grooves 43, for example, includes a first groove portion 43a having a depth d14, and a second groove portion 43b connected to the inboard shoulder main groove 6 and having a depth d15 smaller than the depth d14 of the first groove portion 43a. The depth d15 of the second groove portion 43b, for example, is in a range of from 0.60 to 0.70 times the depth d14 of the first groove portion 43a. The inboard shoulder lateral grooves 43 may be useful to improve steering stability as well as wet performance.

As illustrated in FIG. 9, the inboard shoulder sipes 44, for example, traverse the inboard shoulder land portion 13 completely. The inboard shoulder sipes 44, for example, are inclined with respect to the tire axial direction in the same direction as the inboard shoulder lateral grooves 43, more preferably extending in parallel with the inboard shoulder lateral grooves 43.

The respective inboard shoulder sipes 44, for example, are continuous to the respective inboard middle sipes 42 smoothly through the inboard shoulder main groove 6 to facilitate deformation of the inboard shoulder land portion 13, improving initial steering response.

As illustrated in FIG. 1, the tread portion 2 has a land ratio LT of from 60% to 70%, for example. Note that the land ratio is a ratio Sb/Sa of total actual ground contact area Sb to a total virtual ground contact area when the all grooves, sipes and slots provided on the tread portion 2 are filled up completely.

When the tread portion 2 is divided into an outboard tread portion 2A between the outboard tread edge (To) and the tire equator C, and an inboard tread portion (2B) between the inboard tread edge Ti and the tire equator C, the outboard tread portion 2A preferably has a land ratio greater than that of the inboard tread portion 2B. Specifically, the land ratio LA of the outboard tread portion 2A, for example, is preferably of from 60% to 80%. Preferably, the lad ratio LB of the inboard tread portion 2B is of from 55% to 75%, for example. The tread portion 2 as such generate large cornering force when cornering while maintaining excellent inositol steering response.

While the particularly preferable embodiments in accordance with the present disclosure have been described in detail, the present disclosure is not limited to the illustrated embodiments but can be modified and carried out in various aspects.

Example

Figure 11:
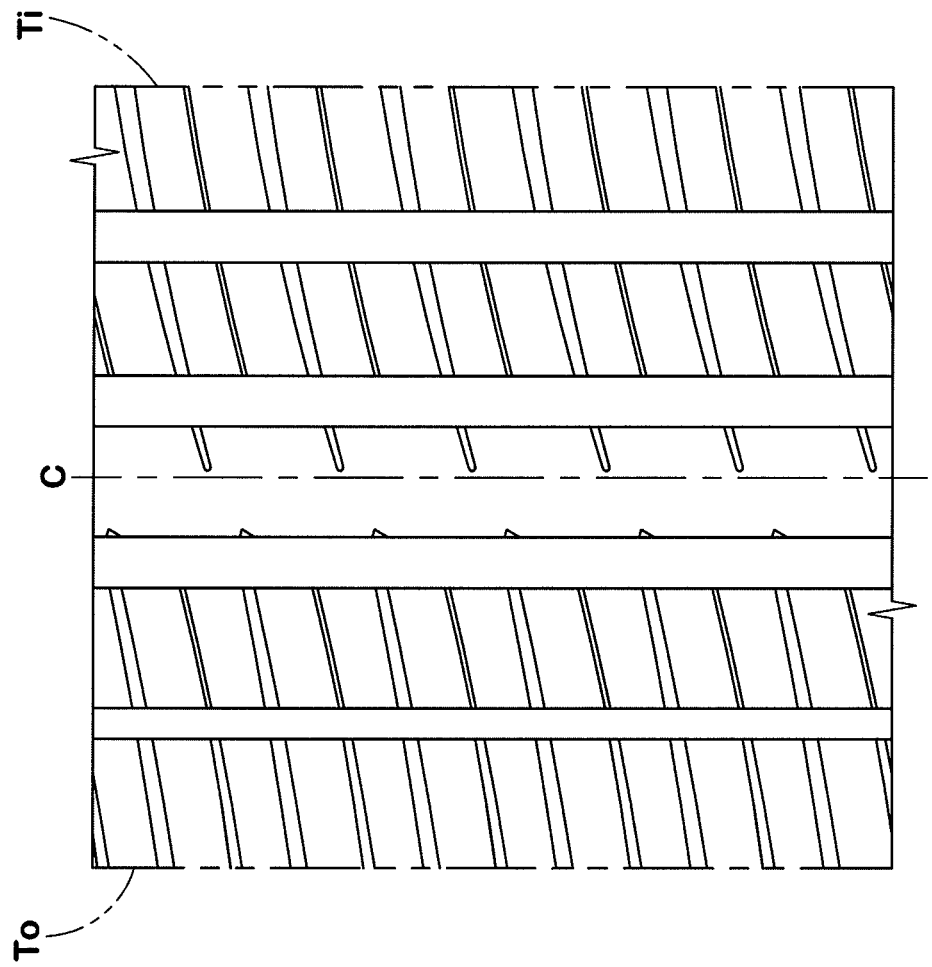
FIG. 11 is a development view of a tread portion in accordance with a comparative example tire.

Tires 215/60R15 with a basic tread pattern as shown in FIG. 1 were manufactured by way of trial based on the specification in Table 1. As a reference tire (Ref. 1), as illustrated in FIG. 11, a tire that includes an outboard middle land portion which is provided with a plurality of lateral grooves having an angle same as the other lateral grooves provided on the other land portions and traversing the outboard middle land portion completely was also manufactured. Then, ride comfort, steering stability and noise performance of each test tire was tested. The common specification and the testing method of the test tires are as follows:

rim size: 16×6.5 J
tire inner pressure: 210 kPa
test vehicle: FR with displacement of 2500 cc
tire mounting locations: all wheels Ride Comfort and Steering Stability Test:

A test driver drove the test vehicle on a dry pavement road, and then evaluated ride comfort and steering stability of the vehicle by the driver's sense. The test results are shown in Table 1 by a point score system in which the comparative example (Ref. 1) is assumed to be 100. The larger numeric value indicates better ride comfort and steering stability.

Noise Performance Test:

Interior vehicle noise of the test vehicle when traveling on a paved dry road at speed of 60 km/h was measured. The test results are shown in Table 1 by an index in which the comparative example (Ref. 1) is assumed to be 100. The smaller numeric value indicates better noise performance.

Table 1 shows the test results.

TABLE 1

|  | Ref. 1 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Tread pattern | FIG. 11 | FIG. 1 | FIG. 1 | FIG. 1 | FIG. 1 | FIG. 1 | FIG. 1 | FIG. 1 | FIG. 1 |
| Outboard tread portion land ratio LA (%) | 70 | 70 | 60 | 80 | 70 | 70 | 70 | 70 | 70 |
| Inboard tread portion land ratio LB (%) | 65 | 65 | 65 | 65 | 55 | 75 | 65 | 65 | 65 |
| lateral groove pitches P1/tread width TW | 0.15 | 0.15 | 0.15 | 0.15 | 0.15 | 0.15 | 0.10 | 0.12 | 0.18 |
| Outboard middle lateral groove angles θ2 (deg.) | 80 | 35 | 35 | 35 | 35 | 35 | 35 | 35 | 35 |
| Outboard recess lengths W12/inboard slot lengths L6 | 0.20 | 0.20 | 0.20 | 0.20 | 0.20 | 0.20 | 0.20 | 0.20 | 0.20 |
| Ride comfort (score) | 100 | 100 | 101 | 98 | 101 | 97 | 101 | 101 | 99 |
| Steering stability (score) | 100 | 106 | 104 | 107 | 104 | 107 | 102 | 103 | 107 |
| Noise performance (index) | 100 | 96 | 98 | 96 | 97 | 95 | 95 | 95 | 98 |
|  | Ex. 9 | Ex. 10 | Ex. 11 | Ex. 12 | Ex. 13 | Ex. 14 | Ex. 15 | Ex. 16 | Ex. 17 |
| Tread pattern | FIG. 1 | FIG. 1 | FIG. 1 | FIG. 1 | FIG. 1 | FIG. 1 | FIG. 1 | FIG. 1 | FIG. 1 |
| Outboard tread portion land ratio LA (%) | 70 | 70 | 70 | 70 | 70 | 70 | 70 | 70 | 70 |
| Inboard tread portion land ratio LB (%) | 65 | 65 | 65 | 65 | 65 | 65 | 65 | 65 | 65 |
| lateral groove pitches P1/tread width TW | 0.20 | 0.15 | 0.15 | 0.15 | 0.15 | 0.15 | 0.15 | 0.15 | 0.15 |
| Outboard middle lateral groove angles θ2 (deg.) | 35 | 25 | 30 | 45 | 50 | 35 | 35 | 35 | 35 |
| Outboard recess lengths W12/inboard slot lengths L6 | 0.20 | 0.20 | 0.20 | 0.20 | 0.20 | 0.10 | 0.15 | 0.25 | 0.30 |
| Ride comfort (score) | 98 | 98 | 99 | 101 | 101 | 98 | 99 | 100 | 100 |
| Steering stability (score) | 107 | 105 | 105 | 104 | 103 | 106 | 106 | 104 | 103 |
| Noise performance (index) | 99 | 95 | 95 | 97 | 98 | 96 | 96 | 96 | 95 |

From the test results, it is confirmed that the example tires of Ex. 1 to 17 improve noise performance and steering stability while exerting excellent ride comfort.

Figure 12:
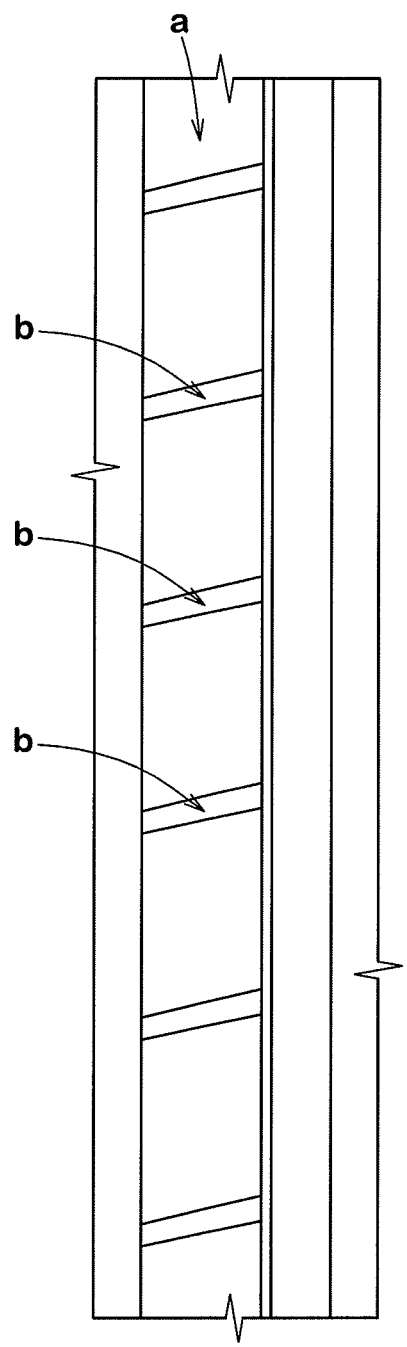
FIG. 12 is an enlarged view of the outboard middle land portion in accordance with a reference.

Tires 215/60R15 with a basic tread pattern as shown in FIG. 1 were manufactured by way of trial based on the specification in Table 2. As a reference tire (Ref. 2), as illustrated in FIG. 12, a tire that includes an outboard middle land portion (a) which is provided with a plurality of lateral grooves (b) having an angle same as the other lateral grooves provided on the other land portions was also manufactured. Note that the tread portion of the reference tire had the substantially same configuration as the tread portion shown in FIG. 1 except for the above difference. Then, steering stability and wear resistance of each test tire was tested. The common specification and the testing method of the test tires are as follows:

rim size: 16×6.5 J
tire inner pressure: 210 kPa
test vehicle: FR with displacement of 2500 cc
tire mounting locations: all wheels Steering Stability Test:

A test driver drove the test vehicle on a dry pavement road, and then evaluated steering stability including initial steering response of the vehicle by the driver's sense. The test results are shown in Table 1 by a point score system in which the comparative example (Ref. 2) is assumed to be 100. The larger numeric value indicates better the steering stability including initial steering response.

Wear Resistance Test:

Using wear energy measurement device, the wear energy difference between the outboard middle land portion and the crown land portion was measured. The test results are shown in Table 2 by an index in which the value of the wear energy difference of comparative example (Ref. 2) is assumed to be 100. The smaller numeric value indicates better the wear resistance.

Table 2 shows the test results.

TABLE 2

| | Ref. 2 | Ex. 18 | Ex. 19 | Ex. 20 | Ex. 21 | Ex. 22 | Ex. 23 | Ex. 24 | Ex. 25 |
|---|---|---|---|---|---|---|---|---|---|
| Outboard middle land portion pattern | FIG. 12 | FIG. 2 | FIG. 2 | FIG. 2 | FIG. 2 | FIG. 2 | FIG. 2 | FIG. 2 | FIG. 2 |
| Outboard shoulder main groove width W1/maximum main groove width | 0.60 | 0.60 | 0.45 | 0.50 | 0.65 | 0.70 | 0.60 | 0.60 | 0.60 |
| Outboard middle lateral groove lengths L5/outboard middle land portion width W8 | 0.64 | 0.64 | 0.64 | 0.64 | 0.64 | 0.64 | 0.50 | 0.60 | 0.70 |
| Inboard slot depths d9/first groove portion depths d2 of outboard middle lateral grooves | 1.49 | 1.49 | 1.49 | 1.49 | 1.49 | 1.49 | 1.49 | 1.49 | 1.49 |
| Inboard middle lateral groove angle θ9/outboard middle lateral groove angles to tire axial direction | 1.00 | 0.25 | 0.25 | 0.25 | 0.25 | 0.25 | 0.25 | 0.25 | 0.25 |
| Steering stability (score) | 100 | 110 | 110 | 110 | 109 | 108 | 107 | 109 | 110 |
| Wear resistance (index) | 100 | 103 | 104 | 104 | 103 | 102 | 101 | 102 | 104 |

| | Ex. 26 | Ex. 27 | Ex. 28 | Ex. 29 | Ex. 30 | Ex. 31 | Ex. 32 |
|---|---|---|---|---|---|---|---|
| Outboard middle land portion pattern | FIG. 2 | FIG. 2 | FIG. 2 | FIG. 2 | FIG. 2 | FIG. 2 | FIG. 2 |
| Outboard shoulder main groove width W1/maximum main groove width | 0.60 | 0.60 | 0.60 | 0.60 | 0.60 | 0.60 | 0.60 |
| Outboard middle lateral groove lengths L5/outboard middle land portion width W8 | 0.80 | 0.64 | 0.64 | 0.64 | 0.64 | 0.64 | 0.64 |
| Inboard slot depths d9/first groove portion depths d2 of outboard middle lateral grooves | 1.49 | 1.30 | 1.40 | 1.60 | 1.70 | 1.49 | 1.49 |
| Inboard middle lateral groove angle θ9/outboard middle lateral groove angles to tire axial direction | 0.25 | 0.25 | 0.25 | 0.25 | 0.25 | 0.20 | 0.30 |
| Steering stability (score) | 110 | 110 | 110 | 109 | 107 | 110 | 108 |
| Wear resistance (index) | 105 | 105 | 103 | 102 | 101 | 103 | 103 |

From the test results, it is confirmed that the example tires of Ex. 18 to 32 improve steering stability while maintaining tread wear resistance.

What is claimed is:

1. A tire comprising:
a tread portion having a designated mounting direction to a vehicle, the tread portion comprising an outboard tread edge and an inboard tread edge to be located on an outboard side and an inboard side of a vehicle, respectively, upon being mounted on the vehicle, circumferentially and continuously extending main grooves, and land portions divided by the main grooves;
the land portions comprising an outboard shoulder land portion including the outboard tread edge, an outboard middle land portion arranged adjacent to the outboard shoulder land portion, an inboard shoulder land portion including the inboard tread edge, and an inboard middle land portion arranged adjacent to the inboard shoulder land portion;
each of the outboard shoulder land portion, the inboard shoulder land portion, and the inboard middle land portion being provided with axially extending outboard shoulder lateral grooves, inboard shoulder lateral grooves and inboard middle lateral grooves, respectively, wherein the outboard shoulder lateral grooves, the inboard shoulder lateral grooves and the inboard middle lateral grooves are inclined at angles in a range from 75° to 90° with respect to a tire circumferential direction; and
the outboard middle land portion being provided with outboard middle lateral grooves extending from an edge of the outboard middle land portion located on the outboard tread edge side toward the inboard tread edge, wherein the outboard middle lateral grooves are inclined with respect to a tire circumferential direction at angles smaller than those of the outboard shoulder lateral grooves, the inboard shoulder lateral grooves and the inboard middle lateral grooves,
wherein the outboard middle land portion includes a circumferentially and continuously extending outboard middle longitudinal narrow groove having a width smaller than widths of the main grooves, the outboard middle longitudinal narrow groove forming a circumferentially extending inner land section on an inboard tread edge side of the outboard middle land portion, wherein the outboard middle grooves extend from the edge of the outboard middle land located on the outboard tread edge side to the outboard middle longitudinal narrow groove, and wherein the inner land section extends continuously in the tire circumferential direction to form a plane rib without any sipes or grooves.

2. The tire according to claim 1, wherein
the lateral grooves provided on each of the outboard shoulder land portion, the inboard shoulder land portion, and the inboard middle land portion traverse the respective land portions completely.

3. The tire according to claim 1, wherein
when the tread portion is divided into an outboard tread portion between the outboard tread edge and a tire equator, and an inboard tread portion between the inboard tread edge and the tire equator, the outboard tread portion has a land ratio greater than that of the inboard tread portion.

4. The tire according to claim 1, wherein
each of the outboard shoulder land portion, the inboard shoulder land portion, and the inboard middle land portion is further provided with axially extending outboard shoulder narrow lateral grooves, inboard shoulder narrow lateral grooves and inboard middle narrow lateral grooves traversing the respective land portions completely and having groove widths smaller than widths of the outboard shoulder lateral grooves, the inboard shoulder lateral grooves and inboard middle lateral grooves, respectively.

5. The tire according to claim 4, wherein
the narrow lateral grooves comprise one or more lateral sipes having an opening width of less than 1.5 mm on a ground contact surface of the tread portion.

6. The tire according to claim 4, wherein
the lateral grooves and the narrow lateral grooves are arranged alternately in the tire circumferential direction on each of the outboard shoulder land portion, the inboard shoulder land portion, and the inboard middle land portion.

7. The tire according to claim 1,
the land portions further comprising a crown land portion between the outboard middle land portion and the inboard middle land portion, and
the crown land portion being provided with one or more outboard recesses extending from an edge of the crown land portion on the outboard tread edge side toward the inboard tread edge and terminating within the crown land portion.

8. The tire according to claim 1, wherein
the outboard middle land portion is provided with a circumferentially and continuously extending outboard middle longitudinal narrow groove having a groove width smaller than those of the main grooves, and
the outboard middle longitudinal narrow groove is located on the inboard tread edge side with respect to an axial center location of the outboard middle land portion.

9. The tire according to claim 1, wherein
the outboard middle lateral grooves terminate within the outboard middle land portion.

10. The tire according to claim 9, wherein
the main grooves comprise an outboard shoulder main groove between the outboard shoulder land portion and the outboard middle land portion, and
the outboard shoulder main groove has a minimum groove width among the main grooves.

11. The tire according to claim 10, wherein
each of the outboard middle lateral grooves comprises a first groove portion having a constant depth and a second groove portion having a depth gradually decreasing toward the inboard tread edge.

12. The tire according to claim 11, wherein
the lateral grooves comprise inboard middle lateral grooves traversing the inboard middle land portion and inboard shoulder lateral grooves traversing the inboard shoulder land portion, and
the respective inboard shoulder lateral grooves are arranged to be continuous to the respective inboard middle lateral grooves smoothly through one of the main grooves.

13. The tire according to claim 12, wherein
a maximum angle of the inboard shoulder lateral grooves with respect to the tire axial direction is smaller than a maximum angle of the inboard middle lateral grooves with respect to the tire axial direction.

14. The tire according to claim 1, wherein
the land portions further comprising a crown land portion arranged along a tire equator of the tread portion, the crown land portion being separated from the inboard middle land portion by an inboard crown groove,
the crown land portion being provided with inboard slots extending from an edge of the crown land portion located on an inner tread edge side toward the center axis and terminating before the center axis, and
the inboard slots are continuous with the inboard middle lateral grooves through the inboard crown groove.

15. The tire according to claim 14, wherein
the inboard shoulder lateral grooves, the inboard middle lateral grooves and inboard slots continuously extend across the inboard crown groove and the main groove between the inboard middle land portion and the inboard shoulder land portion, and
the continuously extending inboard shoulder lateral grooves, the inboard middle lateral grooves and the inboard slots decrease in width from the inboard tread edge toward the tire equator.

16. A tire comprising:
a tread portion having a designated mounting direction to a vehicle, the tread portion comprising an outboard tread edge and an inboard tread edge to be located on an outboard side and an inboard side of a vehicle, respectively, upon being mounted on the vehicle, circumferentially and continuously extending main grooves, and land portions divided by the main grooves;
the land portions comprising an outboard shoulder land portion including the outboard tread edge, an outboard middle land portion arranged adjacent to the outboard shoulder land portion, an inboard shoulder land portion including the inboard tread edge, and an inboard middle land portion arranged adjacent to the inboard shoulder land portion;
each of the outboard shoulder land portion, the inboard shoulder land portion, and the inboard middle land portion being provided with axially extending outboard shoulder lateral grooves, inboard shoulder lateral grooves and inboard middle lateral grooves, respectively, wherein the outboard shoulder lateral grooves, the inboard shoulder lateral grooves and the inboard middle lateral grooves are inclined at angles in a range from 75° to 90° with respect to a tire circumferential direction; and the outboard middle land portion being provided with a circumferentially and continuously extending outboard middle longitudinal narrow groove having a groove width smaller than widths of the main grooves to form a circumferentially extending inner land section on an inboard tread edge side of the outboard middle land portion, wherein the inner land section extends continuously in the tire circumferential direction, wherein the outboard middle longitudinal narrow groove forming a circumferentially extending inner land section on an inboard tread edge side of the outboard middle land portion, wherein the outboard middle grooves extend from the edge of the outboard middle land located on the outboard tread edge side to the outboard middle longitudinal narrow groove, and wherein the inner land section extends continuously in the tire circumferential direction to form a plane rib without any sipes or grooves.

17. The tire according to claim 16, wherein
the lateral grooves provided on each of the outboard shoulder land portion, the inboard shoulder land portion, and the inboard middle land portion traverse the respective land portions completely.

18. The tire according to claim 17, wherein
each of the outboard shoulder land portion, the inboard shoulder land portion, and the inboard middle land portion is further provided with axially extending outboard shoulder narrow lateral grooves, inboard shoulder narrow lateral grooves and inboard middle narrow lateral grooves traversing the respective land portions completely and having groove widths smaller than widths of the outboard shoulder lateral grooves, the inboard shoulder lateral grooves and inboard middle lateral grooves, respectively.

19. The tire according to claim 16, wherein
each of the outboard shoulder land portion, the inboard shoulder land portion, and the inboard middle land portion is further provided with axially extending outboard shoulder narrow lateral grooves, inboard shoulder narrow lateral grooves and inboard middle narrow lateral grooves traversing the respective land portions completely and having groove widths smaller than widths of the outboard shoulder lateral grooves, the inboard shoulder lateral grooves and inboard middle lateral grooves, respectively.

* * * * *